Figure 1:
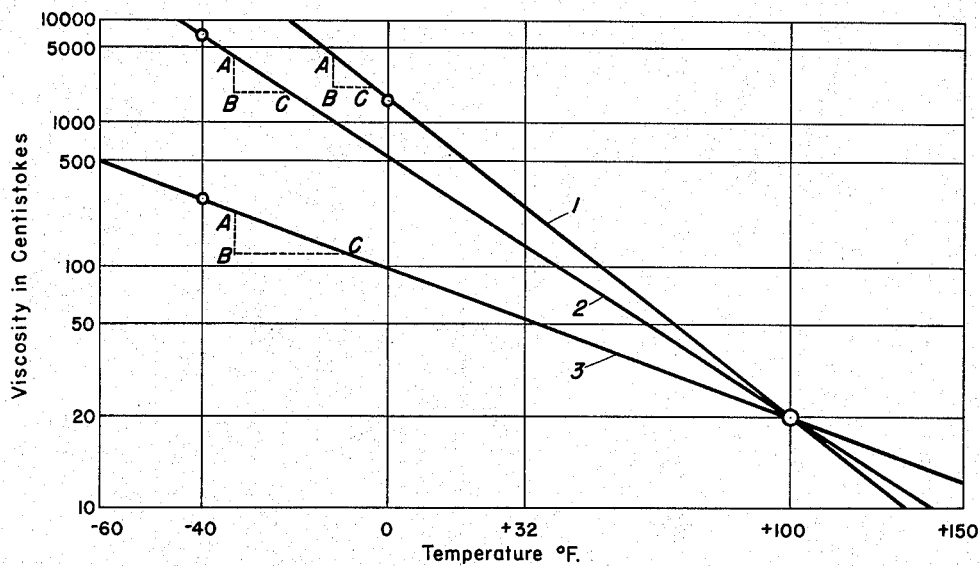

INVENTOR
MERRELL R. FENSKE
ATTORNEY

Patented Nov. 4, 1952

2,616,854

UNITED STATES PATENT OFFICE 2,616,854

HYDRAULIC FLUID

Merrell Robert Fenske, State College, Pa., assignor to the United States of America as represented by the Secretary of the Navy Application November 13, 1943, Serial No. 510,171

1 Claim. (Cl. 252—79)

This invention relates to fluids for transmitting or absorbing energy and, more particularly, to a new and improved hydrocarbon-base hydraulic fluid suitable for use in hydraulically-operated equipment, and to a novel method by which the fluid may be produced expeditiously.

Hydraulically operated mechanisms may roughly be classified into two types; i. e., (1) those wherein a hydraulic fluid is employed for the purpose of transferring the actuating energy to various types of actuating devices; and (2) those wherein a fluid is employed in a device designed to absorb or dampen shock. The first class of devices is exemplified by actuating equipment for landing gears, wing flaps, brakes, variable pitch propellers, control and automatic pilot steering equipment, transmissions, fluid clutches, fire control devices, gun turret rotating mechanisms, steering devices, elevators, hoists, and the like. The second class of devices includes artillery recoil mechanisms, shock absorbers, arresting gears, and the like.

In the field of military applications of hydraulically operated devices, the reliability and the precise functioning of the equipment over extreme conditions of use are of prime importance. Wide temperature variations are commonly encountered and therefore uniformity of hydraulic characteristics over a wide temperature range is of utmost importance in the selection of hydraulic fluids for military applications.

Among the various desirable characteristics for a hydraulic fluid suitable for the extremely severe conditions of military use, are good lubricating qualities over a wide range of temperature conditions. For this reason the fluid should have a reasonably high viscosity at elevated temperatures, and a reasonably low viscosity at very low temperatures. This requires, for example, a fluid having a viscosity of about 10 to 100 centistokes at 100° F. and a very low viscosity-temperature coefficient. Lubricating qualities are especially important in the case of hydraulic pumps, fluid motors and other devices wherein various sealing media or parts undergo sliding or rotary action in valves, pistons and other mechanical parts. These seals may comprise various packings, leather and a variety of rubber compositions. The fluid must provide lubrication as these sealing media slide over various metal parts, otherwise, the seals will be torn or abraded and then leak. Good lubrication of hydraulic pumps is of particular importance inasmuch as such pumps may generate pressures of 1,000 or more pounds per square inch and must operate at high volumetric efficiency.

It is also desirable that the fluid remain clear and limpid over a temperature range from −40° F. or lower to 200° F. or higher. It is further desirable that the fluid remain stable not only against oxidation but also under conditions of extreme shear.

In addition to the foregoing properties, it is desirable that the hydraulic fluid does not harm, disintegrate, swell or shrink excessively, the various sealing media likely to be encountered in hydraulic equipment. It is also desirable that the fluid possess good antiwear and antirust properties and be sufficiently nonvolatile to obviate the development of a tacky condition during repair of the equipment.

An object of the present invention is to provide a hydraulic fluid characterized by the foregoing desirable properties.

Another object of the invention is to provide a fluid which will permit the operation of hydraulically operated equipment over an extremely broad range of temperature conditions.

A further object is the provision of a hydrocarbon-base hydraulic fluid that has a low viscosity at low temperatures and which also possesses a reasonably high viscosity and a low volatility at elevated temperatures, so as to afford ample lubrication and sealing against excessive high temperature leakage.

A still further object of the invention is to provide a fluid of the character described, which has a high resistance to shear, that is, one wherein the viscosity breakdown by shear is low when subjected to service conditions where there is excessive throttling, or where there is the conversion of relatively large amounts of hydraulic energy into fluid friction and heat.

Still another object of the invention is to provide a method of producing a hydraulic fluid of the character described.

An additional object of the invention is to provide a hydraulic fluid characterized by little change in properties on prolonged low temperature storage; a very low swelling action on various rubber sealing media; a high stability against oxidation, corrosion and viscosity change; a relatively high flash and fire point; a very low rate of change of viscosity with temperature; and a relatively high fluidity at low temperatures, with a low freezing point and freedom from gelation at very low temperatures.

These and other objects of the invention will be understood as the invention is hereinafter more particulary described.

I have found that the foregoing objects may be attained by a combination of two or more carefully selected components. Basically, the combination hydraulic fluid of the present invention comprises:

(1) a substantially wax-free hydrocarbon-base stock having a boiling point range lying between the limits of about 400° F. to about 800° F.; and (2) an oil-soluble, linear-type organic polymer (a) having a molecular weight within certain critical limits, and (b) being present in certain critical amounts.

The base stock preferably consists substantially of saturated isoparaffinic or naphthenic hydrocarbons: i. e., the base stock is substantially free of wax-forming components, unsaturates, aromatic hydrocarbons, and oxygenated and nitrogeneous hydrocarbon derivatives.

As regards the polymeric additive, the polymer (a) should have a molecular weight between about 5,000 and about 20,000; (b) should be sufficiently soluble in the base stock to produce a clear, fluid solution which is stable on prolonged storage at all temperatures within the range of at least —40° F. to +200° F.; and (c) should be used in an amount sufficient to produce an A. S. T. M. viscosity-temperature slope less than 0.60 and a viscosity of 10–100 centistokes at 100° F. Practically speaking, these amounts normally lie within the range of about 5% to about 20%, on a weight per cent basis, the particular concentration depending partly upon the nature of the base stock, partly upon the nature of the particular polymer selected, and, partly upon the specific properties desired in the finished fluid.

Figure 2:
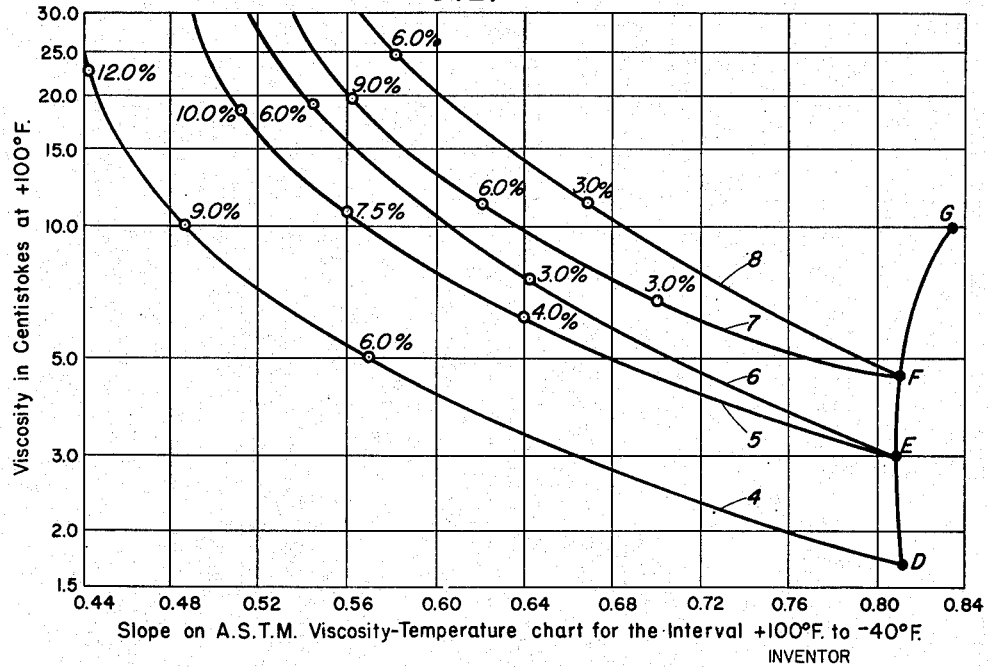

The hydraulic fluid of the present invention, as briefly described above has particularly outstanding characteristics which will be apparent from an inspection of the accompanying drawing, in which Fig. 1 is a graphical representation of an A. S. T. M. (D341–39) viscosity-temperature plot for three fluids; and Fig. 2 is a blending chart graphically showing the effect of various amounts of polymers on the viscosity and A. S. T. M. viscosity-temperature slope of several base stocks when blended in accordance with the present invention.

Referring to Fig. 1, the line 1 typifies a conventional type of mineral oil having 20 centistokes viscosity at +100° F. Line 2 characterizes a desirable type of hydrocarbon-base hydraulic oil. Line 3 represents the viscosity-temperature relationships for fluids of the present invention. These three oils or fluids, purely for purposes of illustration, have been matched in viscosity at +100° F. They can be so matched at any other arbitrarily selected temperature and it will be understood that the present invention does not relate exclusively to oils of 20 centistokes viscosity at +100° F., since the viscosity of the present fluids may vary from about 10 to about 100 centistokes at +100° F. By inspection of Fig. 1 it will be apparent that at —40° F. the centistoke viscosities of oils 1, 2 and 3 are respectively: greater than 40,000, about 7,000, and 300. Thus the fluid 3 of the present invention has a viscosity at —40° F. which is less than 1/20 the viscosity of the fluid 2, and less than 1/100 the viscosity of the base stock 1.

In addition to a hydraulic fluid's viscosity, its change in viscosity with temperature is of importance. It is possible to give this property a more or less quantitative or mathematical value by determining the slope of the lines on Fig. 1, the value thus obtained (hereinafter called the "A. S. T. M. slope") being very useful in blending. The A. S. T. M. slope for any of the lines drawn on Fig. 1 is of course the linear distance AB, divided by the linear distance BC. Thus it is found that the slope of oil 1 is 0.85; of oil 2, 0.73; and of oil 3, 0.44. Specifying the oil's viscosity and A. S. T. M. slope, therefore, defines the viscosity-temperature behavior of that oil over a relatively wide temperature interval. With the foregoing explanation in mind, it will be apparent that by the use of a special hydrocarbon-base stock to which is added 5 to 20 weight per cent or more of oil soluble polymers of controlled molecular weight, the viscosity of the base stock is increased from about 3 to about 15 times, and its A. S. T. M. slope is decreased 25 to 50 or more per cent.

Having now briefly characterized the hydraulic fluid of the present invention, it will be convenient to consider in somewhat greater detail the nature of the various components. As a matter of convenience, the polymeric additives will first be discussed; thereafter the base stock will be considered; and lastly the method of incorporation will be described.

I. THE POLYMERIC ADDITIVES

Referring now to the polymeric additive, a large number of materials of this type are available for use in accordance with the present invention. These materials include polymerized vinyl-type compounds such as the oxygen-containing vinyl polymers or the hydrocarbon-type vinyl polymers: for example, the polymers of vinyl ethers, vinyl esters, acrylic acid esters, methacrylic acid esters; or the polyisobutylene and polystyrene type of polymers. Polyisobutylenes and polymeric esters of methacrylic acid, particularly the higher esters such as the octyl esters and the like, are especially suited for the purpose of the present invention, these compounds being readily available under the trade names of "Polybutenes" and "Acryloids," respectively.

As previously indicated, the molecular weight of the polymeric additive is of great importance for several reasons. In the first place, in order to provide hydraulic fluids that can assimilate or dissipate relatively large amounts of hydraulic energy, either as useful work or as friction, without undergoing serious intramolecular changes resulting in a considerable viscosity decrease in the fluid, it has been found in accordance with the present invention that the molecular weight of the polymeric additive must be carefully controlled so as to lie within the range from about 5,000 to about 20,000 and preferably within the range from about 5,000 to about 15,000. Polymers having molecular weights within these limits do not show a serious viscosity loss under high shear or under conditions where there is excessive throttling or wire-drawing. Indeed, one of the most important discoveries upon which the present invention is based is the fact that the closer the molecular weight of the polymer is to the lower limit (namely, about 5,000) the more resistant the fluid is to changes in viscosity by shear. It is therefore possible to select a molecular weight within the aforesaid range to meet practically any shear requirements that may be imposed.

The molecular weight of the polymeric additive is also important because of its relation to the solubility of the material in the base stock at temperatures which range from —50° F. or below to above 200° F. In other words, it has been found that the solubility of the additive is of utmost importance, and molecular weight is, of course, one of the several factors in such solubility. Indeed, solubility is of such importance that tests are made to ascertain whether the selected additive is satisfactory from this point of view. Adequate solubility is also judged by visual inspection of the additive for any insoluble materials, or gel structures. However, a much more sensitive method of judging solubility is based upon viscosity measurements. If viscosities are measured, (e. g., by A. S. T. M. procedure D445-42T) at sub- as well as at above-normal temperatures, and these measurements repeated at successive time intervals of hours or days, any incompatibility or insolubility of polymer and base stock becomes readily discernible by varying and non-reproducible viscosity measurements. It is also sometimes desirable as a test of adequate polymer solubility to measure the viscosity at different rates of shear over the range from about 200 to 2,000 reciprocal seconds. A varying or erratic viscosity at these variable shear rates is also evidence of inadequate solubility.

In most of the applications intended for the present improved hydrocarbon-base hydraulic fluids, good viscosity-stability under conditions of high shear is essential. Thus if the viscosity of a specific fluid for a specific purpose is carefully adjusted to meet certain operating requirements over a wide temperature range, it is of course vitally important that the viscosity does not change unduly with use. A decrease in viscosity will be primarily objectionable at normal or elevated temperatures because there will be more leakage, more slippage in mechanical parts, more difficulty in attaining the required pump pressures and displacements, and more wear in certain parts of the hydraulic system. An increase in viscosity during use is objectionable at low temperatures, for certain parts of the hydraulic equipment may be sluggish, not capable of being coordinated with other operations, or may even become inoperative because of the excessive viscosity at low temperatures.

Under conditions of high shear or where there is excessive throttling or wire-drawing of the fluid, (as where a fluid flows with high pressure drop through short distances in turbulent flow) some of the polymers tend to depolymerize. In view of the fact that, in the present fluids, the polymers contribute very extensively to the fluid's viscosity, it is necessary that this depolymerization-by-shear be held within definite limits, or the viscosity of the fluid will have decreased to troublesome values, as above outlined. As hereinbefore described, this is accomplished by restricting and limiting the molecular size of the polymers that are used. Control of the molecular weight of the polymer is therefore an important feature of the present invention.

Depolymerization-by-shear is suitably evaluated by pumping the fluid to pressures of 500 to 2,000 pounds per square inch, using gear, piston or vane-type hydraulic pumps. The entire pressure is then unloaded through a suitable pressure relief valve, whereupon the fluid is again fed to the pump to repeat the operation or cycle. An arbitrarily selected number of cycles is chosen depending upon the severity of polymer breakdown desired. The lower the temperature at which this opertion is carried out, the more the depolymerization. An acceptable polymer stability against shear, throttling or wire-drawing is one that produces less than 20 per cent viscosity decrease in the fluid after 5,000 cycles at 100° F. using 1,000 pounds per square inch as the pressure drop across a Vickers balanced-type hydraulic relief valve. This is considered a reasonably severe test. A viscosity decrease by this shearing operation, of 15 per cent or less, is preferred.

It will be understood that various polymeric substances can be used in combination to produce the present improved types of hydrocarbon-base hydraulic fluids. For example, several different molecular weight ranges of the same polymer may be mixed or blended. Different type polymers, of about the same or different molecular weights, can also be used together, although in this case it is preferable to limit the amount of each polymer in the final fluid to about 10 to 15 per cent of the total fluid. Thus, for example, polybutene and acryloid may be present together in the same fluid, but it is preferable to limit the percentage of each, when used in about equal proportions, to a concentration of about 10 to 15 percent. If one polymer is used in much greater proportion than the other, then the predominating polymer may be present in amounts in excess of 15 per cent, while the polymer in minor proportion may be limited to 5 to 10 per cent concentration in the finished fluid. There are certain advantages in the co-blending of polymers, for it is thereby possible to take greater advantage of specific properties possessed by any particular polymer. For example, a polymer having good viscosity-increasing properties can thereby be utilized along with one having particularly good slope-decreasing properties to give a greater range of viscosity and A. S. T. M. slopes than that conveniently or economically obtainable by either polymer alone.

One of the difficulties with hydraulic fluids composed of highly refined mineral oil and polymeric substances has been their viscosity-instability in service. In some cases or prolonged use, the viscosity would decrease, while in other cases it would increase 300 to 800 per cent or more. There have also been instances of the polymer precipitating from the solution. None of these changes can be tolerated in certain hydraulic apparatus, where delicate parts, such as pilot, balanced and relay valves have to be actuated in a thoroughly reliable and dependable manner.

In accordance with a further aspect of the present invention, it has been found that exceptional viscosity-stability can be imparted to hydrocarbon-type hydraulic fluids containing high molecular weight polymeric substances by incorporating therein a small amount of substances of the class of materials known as oxidation inhibitors such as those used in transformer, turbine and other low viscosity lubricating oils. Such materials in proportions from about 0.2 to about 2 weight per cent have been found to have very beneficial effects, both on the base stock and on the polymeric materials.

Another difficulty heretofore experienced with certain hydraulic fluids arises from the formation of gummy and insoluble materials upon extended usage, and the etching and pitting of delicate metal parts. This troublesome and undesirable disadvantage may be obviated in accordance with the present invention by the use of the aforesaid oxidation inhibitors.

II. THE BASE STOCK

As previously pointed out, the base stock or fluid in which the polymer is dissolved, contributes in many important ways to the properties of the finished hydraulic fluid. The base stock may comprise specific, more or less individual hydrocarbons (either natural or synthetic), or it may be produced from petroleum and therefore contain a variety of hydrocarbons. Regardless of its chemical composition, however, the base stock must be low freezing; i. e., free from solid separation at temperatures of —40° F. or lower. It must be relatively nonvolatile, so as not to evaporate excessively. For the most part, it should distill in an A. S. T. M. type of distillation within the range from about 400° F. to about 700° F. at atmospheric pressure. It must not contain any unstable or corrosive materials. It is important that the hydraulic fluid should neither swell nor shrink excessively the sealing media, such as synthetic rubbers. It has been found that this can be avoided by excluding aromatic and other highly unsaturated hydrocarbon types, and by having a substantial proportion of isoparaffinic hydrocarbons in the base stock. It has also been found that rubber swelling and shrinkage can be controlled completely by selecting and specifying certain properties of the base stock to be subsequently described.

Where it is desirable to prevent excessive evaporation and the formation of tacky or sticky films when layers of the hydraulic fluid are exposed to the atmosphere, it may be necessary to use blends of two or more base stocks of different boiling ranges. Thus, for example, one portion or fraction may have a substantial part boiling in the range of about 400° to 500° F., while the other portion or fraction may have a substantial part boiling in the range of 650° to 800° F. When polymeric or other high molecular weight substances are added to base stocks comprising the aforesaid blended base stock, the viscosity-temperature coefficients or A. S. T. M. slopes are especially good in that the viscosity of the finished fluid changes relatively little with temperature, and films of the fluid are oily and not sticky.

The various hydrocarbons suitable for the base stocks of the present invention may comprise either single molecular species or mixtures thereof. Thus, tetraisobutane may be used alone or with other hydrocarbons. This particular compound has 3.3 and 51.3 centistokes viscosity at +100° F. and —40° F., respectively; an A. S. T. M. slope of 0.737; and a 200° F. aniline point. Tetraisobutane is obtained by dimerizing diisobutylene and hydrogenating the resulting material. It is also obtainable by polymerizing isobutylene to the tetramer stage and then hydrogenating.

Likewise, alkylates boiling in the range of 400° F. to 700° F. with low freezing points, and substantially olefin-free are also useful as base stocks. They are characterized particularly by their high aniline points, being above 190° to 200° F. These alkylates are isoparaffinic in character and are produced by alkylating and polymerizing olefins with paraffins, starting with the lower molecular weight olefin and paraffin hydrocarbons having usually 3 to 6 carbon atoms per molecule. The alkylates are attractive for the reason that rubber swelling, or shrinking, or general deterioration, is usually low with this type of hydrocarbon. The alkylates may be used either as the principal component of a base stock or for mixing with other hydrocarbon stocks to improve their behavior toward rubber.

Hydrocarbon polymers in the molecular weight range of about 150 to 300 that are essentially saturated in character, are also suitable as base stocks. Such materials may be obtained as by-products from polymer gasoline manufacture. They may be derived from the gasoline by distillation, then hydrogenation to produce saturated hydrocarbons, and, if necessary, dewaxing to attain the desired low freezing point.

In addition to the foregoing isoparaffinic materials from polymerization and alkylation processes, it is possible to produce base stocks by alkylating aromatic hydrocarbons with olefins and subsequently reducing the aromatic part to a naphthene structure, thereby producing synthetic naphthenic-paraffinic materials.

Perhaps the most convenient and extensive source of base stocks is to be found in petroleum, and more particularly in petroleum fractions boiling within the range of about 400° F. to about 700° F. at atmospheric pressure. To prepare such fractions from petroleum, it is desirable to carry out the following steps, approximately in the order listed: (a) preliminary chemical treatment; (b) distillation; (c) dewaxing, when necessary; (d) dearomatization; and (e) clay filtering and blotter pressing.

(a) *Preliminary chemical treatment.*—It is desirable to remove naphthenic acids, phenolic compounds, nitrogen bases and sulfur compounds from that portion of petroleum being processed into base stock. A caustic and acid wash removes most of these materials, the methods and equipment for performing these operations being well known and available in many refineries.

(b) *Distillation.*—Suitable equipment for the relatively close fractionation of the 400° to 700° F. portion of petroleum is available at many refineries. Varying the boiling range of the base stock usually varies its viscosity, and this in turn may vary the viscosity of the finished hydraulic fluid. As already pointed out, it is frequently desirable to have two portions or fractions available for making the base stock. These portions are produced by suitable operations and control of the distillation equipment. In certain cases it may be desirable that the boiling range of each portion be not more than 50° F. to 75° F.

(c) *Dewaxing.*—In those cases where wax separates from the petroleum fraction at low temperatures, it is necessary to effect its removal along more or less conventional lines, with the exception that the dewaxing temperatures may have to be reduced to —40° F. to —70° F., and upwards of 50 per cent may separate as wax. In general, the wax separates easily, and the resulting wax-free oil is very valuable for further processing into finished base stock. Filter presses or rotary continuous filters may be used. Solvent dewaxing may or may not be required. In those instances where wax separates, it is customary to refer to these petroleum materials as being paraffinic. In those cases where there is no wax, the petroleum materials are commonly designated as naphthenic.

(d) *Dearomatization.*—To keep rubber swelling at a minimum, it is esssential to remove aromatic hydrocarbons from the base stock. In general, two methods of dearomatization are available. The first method utilizes sulfuric acid treatment in a manner similar to that commonly used in making white oils or medicinal oils. The other procedure involves the use of a selective solvent to dissolve out the aromatics.

The acid treating method has the advantage of favoring the removal of any more reactive components which might be present in the starting material, and which are undesirable in the finished stock, such as, for example, certain sulfur, nitrogen and oxygenated materials. However, the acid treating process has the disadvantage that certain compounds are formed and assimilated by the oil unless subsequently removed. Such compounds include sulfonates and sulfates. It is usually customary to follow the acid treatment with a caustic wash, and thereafter to eliminate the caustic with a water wash.

The use of solvent extraction to eliminate aromatic hydrocarbons avoids certain complications resulting from the acid treating process. Nevertheless, the particular method of dearomatization selected is largely a matter of refinery practice and convenience.

(e) *Clay filtering and blotter pressing.*—All stocks that have been dearomatized by sulfuric acid treatment should preferably be given a light clay treatment or some equivalent treatment in order to eliminate small amounts of sulfur or oxygenated materials that may remain in the oil even after the caustic or water wash. Such materials appear to be readily adsorbable by the clay. Following this clay treatment, and as a final precaution, the fluid is preferably passed through a filter press containing heavy paper or other equivalent filter medium in order to eliminate any clay or other foreign particles which may be present in the oil, and also to remove traces of moisture. This final step insures a perfectly clean stock, and is particularly desirable for hydraulic fluids that come in contact with complicated and delicate mechanisms.

In general, paraffinic stocks are preferred to naphthenic stocks, because, for a given viscosity, they usually have less effect on rubber, they are somewhat less volatile, and they usually have a somewhat lower A. S. T. M. slope. However, it will be understood that the different types of stocks may be blended so that the more desirable properties of one stock may be used to enhance that of another stock. The base stock preferably has a viscosity from about 2 to about 10 centistokes at +100° F., although portions of it may exceed these limits. That is, in some instances, in order to avoid the formation of sticky films, it may be advantageous to use hydrocarbon portions of about 1.5 centistokes viscosity at +100° F. and blend these with other hydrocarbon portions having a viscosity of 30 centistokes at +100° F. to produce a base stock within the preferred limits of about 2 to about 10 centistokes viscosity at +100° F. The flash point of the base stock preferably lies within the limits of about 200° F. to about 300° F.

III. INCORPORATION

Incorporation of the additives in the base stocks in accordance with the present invention can be understood by reference to Fig. 2 which is a blending chart, showing the manner in which various high molecular weight, polymeric substances affect both the viscosity and the A. S. T. M. slope, when added in various amounts to different base stocks. Points D, E, F, and G represent different base stocks such as derived from petroleum. Point D represents a low viscosity base stock, boiling over the range of about 430° F. to 460° F. at atmospheric pressure. Point G represents a more viscous stock, boiling in the range of 650° F. to 800° F. These two stocks may be mixed or blended to give other stocks having various proportions of stocks D and G. For example, point E may represent a specific stock which may be prepared from petroleum, or it may also represent a mixture of about 60 weight per cent stock D and 40 weight per cent stock G. The same is true for stock F. It may be a separately prepared material, or a mixture of about 40 per cent stock D and 60 per cent stock G.

Curve 4 of Fig. 2 represents the manner in which the A. S. T. M. slope and the viscosity change when various amounts of polymerized octyl methacrylate of about 10,000 molecular weight, an "Acryloid," are added to stock D. The percentages on the curve (e. g., 6, 9, and 12 per cent) represent the weight per cent polymer present in the fluid at these respective points.

Curve 6 shows these same relationships where the polymer comprises Polybutene of about 12,000 molecular weight ("Polybutene B–12") to base stock E. Curve 5 shows the results obtained when polymeric octyl methacrylate of about 10,000 molecular weight, an "Acryloid," is used instead of the Polybutene in base stock E, the percentage figures on curve 5 being the weight per cent "Acryloid" type polymer present in the fluid at the points indicated.

Curve 7 portrays the slope-viscosity relationships for the various indicated percentages of the same "Acryloid" when it is blended into base stock F, while curve 8 also shows these same relationships for blending with "Polybutene B–12" instead of the "Acryloid." Similar curves for other base stocks and polymers can be drawn in an analogous manner. Furthermore, the viscosity scale can be at any selected temperature, such as −40° F., 0° F., +100° F., +210° F., etc. Similarly, the A. S. T. M. slope may be expressed for any arbitrarily selected temperature interval. Each polymer will have a more or less characteristic curve. Some will increase the viscosity with respect to a decrease in slope more than others. In general, the blending curves for any one polymer in different base stock will roughly parallel each other.

The viscosity scale could be extended upwardly to any desired value and the blending curves would simply be smooth extensions in an upward direction of those shown on Fig. 2. For purposes of this invention, fluids having viscosities at +100° F. in the region of 10 to 100 centistokes, and more particularly in the range of about 15 to about 60 centistokes at +100° F., are of principal concern. This viscosity range is suitable for hydraulic fluids for airplanes, automotive vehicles, ships, artillery recoil mechanisms, and various shock-absorbing devices. To permit adequate operation over a wide temperature range; that is, from −40° F. and lower, to +200° F. and higher, it is preferred that fluids of these viscosities have A. S. T. M. slopes below 0.60, and preferably below 0.56. Fig. 2 shows the manner in which this is accomplished. It is clear that the final hydraulic fluid has a viscosity severalfold greater than that of the base stock into which the polymer is blended, and also that the slope of the final fluid is only a fraction of that of the base stock. To obtain finished fluids of the lowest A. S. T. M. slope, it is highly desirable that the slope of the base stock, itself, be as low as possible.

If the finished fluid contains two or more polymers, the blending curve will lie proportionately between the blending curves for the separate polymers. For example, if "Polybutene B–12" and the above-mentioned "Acryloid" are added in equal proportions to base stock E on Fig. 2, the blending curve for this coblend of polymers will be roughly midway between curves 5 and 6 on Fig. 2. In preparing the finished hydraulic fluid, care is exercised in dissolving the polymer in the base stocks, for the rate of solution is apt to be low and it is necessary to avoid overheating and thermal decomposition. In general, blending temperatures are not permitted to exceed 350° F. and wherever possible the free access of air is not permitted at such high blending temperatures, for otherwise undesirable and unnecessary oxidation is apt to occur. It is usually desirable first to prepare carefully a concentrated solution of polymer in the selected base stock (e. g., a 50 weight per cent solution) and then blend the concentrated solution with further amounts of base stock as needed. It is easier to obtain a perfectly homogeneous solution by this method of incorporation.

The oxidation inhibitors used to stabilize these hydraulic fluids should be soluble in the fluids in the amounts required, both at low and elevated temperatures. Their presence must not accelerate the corrosion of the more common metals, such as steel, copper, bronze, aluminum and magnesium. They must not change with use from soluble to an insoluble form, and thereby form precipitates apt to obstruct small fluid passages. Suitable inhibitors comprise one or more of the following organic materials: alkyl or aryl phenol or hydroxy sulfides; aromatic sulfides, disulfides, mercaptans, or thioethers; aromatic amino sulfides; sulfurized fatty acid esters, such as sulfurized sperm, lard, and rapeseed oils; alkyl or aryl esters of phosphorous acid; mono or diaryl amines; and phosphatides, such as lecithin. In certain cases similar proportions, namely, from about 0.2 to about 2 weight per cent, of metal deactivators are used along with the oxidation inhibitors, in order to retard or nullify the powerful oxidation accelerating effects of certain metals, notably copper and its alloys, and steel or iron. Many oxidation inhibitors themselves have this property of metal deactivation. Thus oxidation inhibitors having sulfur in the functional group are also effective as metal deactivators. Certain aryl amines are also effective, especially toward copper.

It will be understood that other materials may be added to the hydraulic fluid to increase the lubricating value, reduce wear and seizure and prolong the life of fast-moving, heavily loaded, mechanical parts. Thus, from about 0.5 to about 2 weight per cent of tricresyl phosphate or dilauryl phosphate are particularly effective.

In order still more clearly to disclose the nature of the present invention, two specific embodiments will now be described. One of these examples illustrates the production of improved hydraulic fluids from a wax-free stock using an Acryloid polymer while the other example describes the preparation of a typical fluid starting with a waxy stock using polyisobutylene polymer as the additive. It should be clearly understood that these examples are given purely by way of example, and are not to be construed as limiting the spirit or scope of the appended claims.

Example I

A commercial gas oil fraction from a refinery pipe-still was obtained from crude typical of Colombian or Winkler production. This gas oil comprised approximately 30 per cent of the crude and showed no sign of wax separation at temperatures as low as −100° F. This pipe-still fraction was then refractionated in an efficient fractional distillation tower to obtain a heart-cut comprising approximately 10 per cent of the original crude or about 30 to 35 per cent of the pipe-still gas oil. This heart-cut had an atmospheric boiling range of 400 to 550° F.; an aniline point of about 150° F.; a viscosity of 2.3 centistokes at 100° F.; an A. S. T. M. viscosity-temperature slope of 0.86; a pour point of less than −90° F., with no evidence of a cloud point above this temperature; and a flash point of 200° F. After an acid-extraction treatment described below, this heart-cut was used as the "base oil."

Also recovered from the refractionation of the commercial pipe-still gas oil stream was a higher-boiling fraction to be subsequently used as the "anti-tack" component of the finished hydraulic fluid. This higher-boiling fraction comprised approximately 30 per cent of the pipe-still fraction, or approximately 9 per cent of the original crude. It had an atmospheric boiling range of about 600 to 800° F.; an aniline point of 180° F.; a viscosity of 10 centistokes at 100° F.; and A. S. T. M. viscosity-temperature slope of 0.86; a pour point of −60° F. with no evidence of clouding above this temperature; and a flash point of 300° F. The "anti-tack" component was used to reduce the volatilization of the "base oil," and thereby avoid the development of a sticky, tacky film upon exposure of the finished oil to the atmosphere.

These two fractions described above were then acid treated, this being done either on the separated components or on a mixture thereof. Where the components were acid treated together the fractions were mixed in the ratio of 3 parts by weight of anti-tack to 7 parts of base oil. The acid treatment was carried out by vigorously agitating for a period of time an emulsified mixture of equal volumes of the oil and 96 per cent or stronger of sulfuric acid. The mixture was then allowed to stratify, the acid layer drawn off, and the oil layer washed once with water, once with 5 per cent sodium carbonate, and twice more with water. The oil layer was then drawn off, free of water. This procedure removed the bulk of the aromatic-type hydrocarbons. The oil layer was then clay-treated by the addition of one pound of Super-Filtrol (or any other similar activated clay) for each 25 gallons of oil, with vigorous beating for 15 minutes. The clay treatment effectively rid the oil of any milky suspension carried over from the water and sodium carbonate washes after acid treatment; it also served to remove those by-products of sulfuric-acid treatment such as sulfates, sulfonates, etc. which cause intense discoloration upon any subsequent heating.

The following illustrative properties result, depending on whether the two components of the base stock were acid-treated separately or together:

| Property | Base Oil | Anti-tack | Base Stock |
|---|---|---|---|
| Viscosity at 100° F._____cs__ | 2.3 | 10 | 3.3 |
| Aniline Point_____°F__ | 175 | 190 | 179 |
| A. S. T. M. Slope_____ | 0.83 | 0.83 | 0.83 |
| Pour Point_____°F__ | <−90 | −60 | −90 |
| Flash Point_____°F__ | 200 | 300 | 210 |

The base stock noted here represents the mixture of approximately 3 parts by weight of anti-tack oil to 7 parts by weight of base oil.

The recovery of oil from the acid treatment was approximately 70 per cent of the charge. In terms of the original crude, this amounted to about 7 per cent, or about 21 per cent of the original pipe-still gas oil. It should also be noted that the product obtained from the acid treatment in any case had a neutralization number of about 0.05 milligram of potassium hydroxide per gram of oil. In the case the neutralization number exceeded 0.10, the oil was again washed with sodium carbonate and water.

Where the acid treatment had been carried out on the base oil and anti-tack separately, then these two materials were blended at this stage in the same ratio of 3 parts by weight of anti-tack to 7 parts by weight of base oil to produce the "base stock." Where the acid treatment had been carried out on the base oil and anti-tack together, then the acid-treated, clay-filtered material constituted the base stock.

To the "base stock" as prepared above was added 7.6 weight per cent of "Acryloid HF," consisting of an approximately 50 weight per cent solution of active Acryloid in a petroleum oil similar in every respect to the base oil described above. The active Acryloid in this solution is a polymerized octyl ester of methacrylic acid, having an average molecular weight between about 9,000 and about 10,000. In addition, there was added 0.2 weight per cent of "Paranox 441" (an oxidation and corrosion inhibitor obtainable from Stanco Distributors comprising di-tertiary butyl cresol). The entire mixture was then stirred vigorously for 15 minutes at a temperature of 100 to 150° F., and finally filtered through several thicknesses of filter paper to remove any dirt, clay, etc. The resulting hydraulic fluid had the following properties:

| | |
|---|---|
| Viscosity at 130° F. | 10.0 centistokes |
| Viscosity at 100° F. | 13.6 centistokes |
| Viscosity at −40° F. | 450 centistokes |
| A. S. T. M. slope 130 to −40° F. | 0.55 |
| Aniline point | 179° F. |
| Pour point | <−75° F. |
| Cloud point | <−75° F. |
| Flash point | 210° F. |
| Fire point | 230° F. |
| Neutralization number | 0.08 mg. KOH per gm. oil |

*Example II*

A commercial fraction of a Pennsylvania gas oil having a very narrow boiling range, the 10 and 90 per cent atmospheric distillation points being 415° and 435° F., respectively, was used, this material being produced in a continuous fractional distillation unit operating at atmospheric pressure using Pennsylvania gas oil as the feed stock. The properties of this material were as follows: a flash point of 200° F.; a viscosity of 1.9 centistokes at 100° F.; a pour point of −20° F.; and an aniline point of 150° F. It comprises approximately 2 per cent of the Bradford Pennsylvania crude. After dewaxing and acid treatment, this cut was used as the "base oil."

Another commercially produced Pennsylvania gas oil fraction, boiling in the range of 575° to 700° F. at atmospheric pressure, was used as the anti-tack component in the finished fluid. This 575° to 700° F. material comprised approximately 2 per cent of the Bradford crude. It had 7.5 centistokes viscosity at 100° F., a flash point of 330° F., a pour point of +20° F., and an aniline point of 175° F.

A solvent dewaxing operation was carried out on each of these components separately, or in the ratio of 3 parts by weight of anti-tack oil to 7 parts by weight of the base oil if used together. The procedure used was to charge the oil and methylethylketone in the ratio of 1 part by volume of oil to 2 parts by volume of ketone, to a large tank capable of being refrigerated, the methylethylketone serving as a diluent and antisolvent for wax, enabling the wax to separate from the oil at low temperatures much more readily than if the wax were caused to separate from the oil alone. In order to facilitate crystallization of the wax and subsequent filtration, one pound of a "filter aid" was added per 50 pounds of oil charged. The cooling tank was equipped with a suitable agitating device such as a stirrer. The first step in the cooling process consisted in circulating brine or other refrigerant through coils in the cooling tank until the temperature of the oil and ketone mixture was lowered to from about +75° to 0° F. or −30° F. At this point, small pieces of solid carbon dioxide were added directly to the oil slurry until the temperature had been lowered to −75° F.

A leaf-type suction filter fitted with a suitable canvas was then lowered into the oil-solvent-wax slurry and suction, from a suitable vacuum pump, was applied to the inside of the filter leaf. The oil and ketone mixture passed through the canvas filter cloth, and thence flowed into a suitable receiver to which the suction was applied. The separated wax remained either on the outside of the filter as a cake, or as a semisolid mass in the tank.

The wax-free oil-ketone mixture was then passed through a flash stripper, causing distillation of the ketone and leaving the stripped oil substantially ketone-free. The oil was then acid-treated exactly as outlined in Example I above. The resulting wax-free aromatic-free oils had the following properties, depending on whether the base oil and anti-tack were treated separately or first blended together to make the base stock:

| Property | Base Oil | Anti-tack | Base Stock |
|---|---|---|---|
| Viscosity at 100° F. cs. | 1.9 | 7.5 | 2.7 |
| Aniline Point ° F. | 180 | 193 | 184 |
| A. S. T. M. Slope | 0.81 | 0.82 | 0.81 |
| Pour Point[1] ° F. | <−75 | −75 | <−75 |
| Flash Point ° F. | 200 | 330 | 210 |

[1] No cloud visible above the temperatures listed.

Recovery of oil from the dewaxing operation amounted to approximately 43 per cent of the charge, or approximately 0.9 per cent of the Bradford crude. Recovery of oil from the acid-treating operation amounted to 80 per cent of the charge or about 0.7 per cent of the Bradford crude. The recovery of usable oil from the original base oil or anti-tack fraction amounted to approximately 34 per cent, the remainder being represented by wax, or aromatic hydrocarbons, or mechanical handling losses.

Where the base oil and anti-tack had not yet been blended, they were then mixed in the 3:7 ratio of anti-tack to base oil, by weight. To the resulting base stock was added 5.2 weight per cent "Polybutene B-12," 0.2 weight per cent "Paranox 441" oxidation and corrosion inhibitor, and 1.0 per cent tricresyl phosphate. "Polybutene B-12" is a polymerized isobutylene of approximately 10,000 to 12,000 molecular weight. The tricresyl phosphate was employed to improve the load-bearing capacities and wear-resistance characteristics of the finished hydraulic fluid.

The mixture of these various components was stirred and heated at 100° to 150° F. for about one hour, after which time the fluid was filtered through several thicknesses of filter paper. The resulting finished hydraulic fluid had the following properties:

| | |
|---|---|
| Viscosity at 130° F. | 10.0 centistokes |
| Viscosity at 100° F. | 14.5 centistokes |
| Viscosity at −40° F. | 500 centistokes |
| A. S. T. M. slope 130° to −40° F. | 0.56 |
| Aniline point | 184° F. |
| Pour point | <−75° F. |
| Cloud point | <−75° F. |
| Flash point | 210° F. |
| Fire point | 225° F. |
| Neutralization number | 0.08 mg. KOH per gm. oil |

The improved hydraulic fluids of the present invention may also be given antirusting properties by incorporating specific organic materials which form adherent and impervious films on metals. Degras is a common constituent of such materials. Certain metal naphthenates are also sometimes used. In other cases, the presence of organic materials forming water-in-oil emulsions afford some relief from rusting in the presence of moisture.

It is recognized that polymers have previously been added to mineral oils. Heretofore, however, the purpose has been to lower the viscosity-temperature coefficient with the least possible increase in viscosity of the base stock. Moreover, in those cases where there have been large increases in viscosity brought about by the addition of polymeric substances, the product may or may not have been improved with regard to viscosity-temperature coefficient, or A. S. T. M. slope. Usually such fluids are characterized more as semisolids, or plastic fluids, or as gels, rather than as a limpid stable fluid capable of absorbing, dissipating, or transmitting large amounts of hydraulic energy without undergoing excessive changes in viscosity in use. Such previous viscous or thickened materials have not been generally useable over a wide temperature range, such as, for example, from −40° F. or lower to +200° F. or higher, inasmuch as they become gels or solids at the low temperature, and show considerable loss in viscosity with use at high temperatures; that is, they are characterized by poor viscosity-shear stability.

The present invention obviates the foregoing disadvantages by proper control of (1) the nature of the base stock, (2) the solubility and molecular weight of the polymer, and (3) the amount of polymer employed.

I claim:

A composition of matter usable as a hydraulic fluid comprising a major portion of high boiling isoparaffinic hydrocarbons boiling between about 400 and 700° F. blended with a relatively small amount sufficient to change the viscosity index thereof substantially, of a polymer of a low boiling olefin said polymer having a molecular weight above about 5000 and a polymerized acrylic acid ester of a saturated alcohol.

MERRELL ROBERT FENSKE.

REFERENCES CITED

The following references are of record in the file of this patent:

UNITED STATES PATENTS

| Number | Name | Date |
|---|---|---|
| 1,559,981 | Petty | Nov. 3, 1925 |
| 2,058,899 | Matheson | Oct. 27, 1936 |
| 2,091,627 | Bruson | Aug. 31, 1937 |
| 2,102,825 | Woodhouse et al. | Dec. 21, 1937 |
| 2,123,641 | Wiezevich | July 12, 1938 |
| 2,179,008 | Campbell | Nov. 7, 1939 |
| 2,198,851 | Wiezevich | Apr. 30, 1940 |
| 2,356,367 | Wright | Aug. 22, 1944 |
| 2,398,943 | Kollen | Apr. 23, 1946 |
| 2,408,983 | Kollen | Oct. 8, 1946 |

FOREIGN PATENTS

| Number | Country | Date |
|---|---|---|
| 515,367 | Great Britain | Dec. 4, 1939 |
| 142,896 | Austria | Apr. 15, 1935 |